Figure 1:
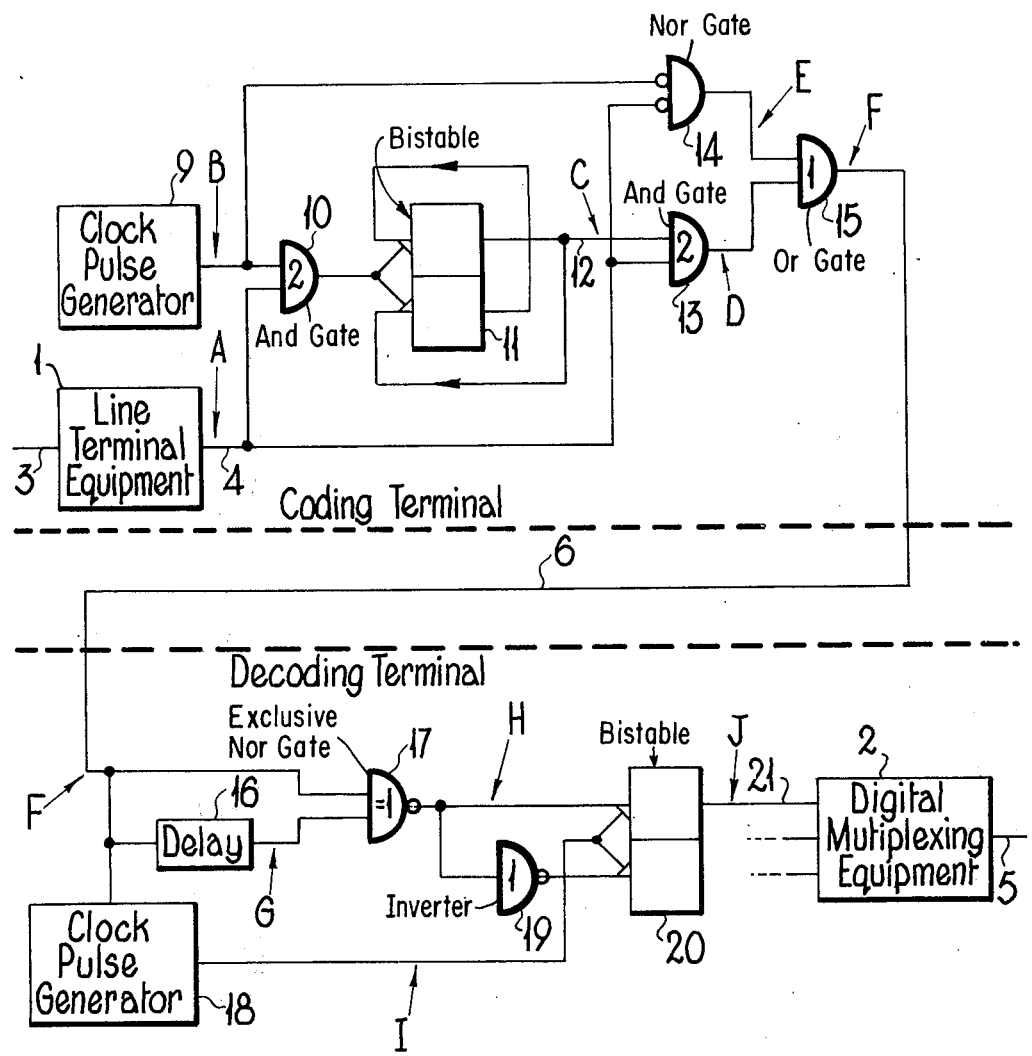

United States Patent [19]
Dorward

[11] 3,953,673
[45] Apr. 27, 1976

[54] DIGITAL DATA SIGNALLING SYSTEMS AND APPARATUS THEREFOR

[75] Inventor: Richard Munro Dorward, Coventry, England

[73] Assignee: The General Electric Company Limited, London, England

[22] Filed: Oct. 16, 1974

[21] Appl. No.: 515,430

[30] Foreign Application Priority Data
Oct. 16, 1973   United Kingdom............... 48145/73

[52] U.S. Cl. .................................. 178/68; 178/88; 325/38 R; 325/322; 340/347 DD
[51] Int. Cl.² .................. H03K 13/24; H04L 25/00
[58] Field of Search ............ 340/347 DD; 325/38 R, 325/141, 321, 43, 322; 178/66, 67, 68, 88

[56] References Cited
UNITED STATES PATENTS

| | | | |
|---|---|---|---|
| 3,369,181 | 2/1968 | Braymer | 325/44 |
| 3,400,369 | 9/1968 | Cooper | 340/167 |
| 3,810,111 | 5/1974 | Patel | 340/172.5 |

*Primary Examiner*—Robert L. Griffin
*Assistant Examiner*—Marc E. Bookbinder
*Attorney, Agent, or Firm*—Kirschstein, Kirschstein, Ottinger & Frank

[57] ABSTRACT

A data signalling system in which binary '0' is transmitted as '01' and binary '1' is transmitted alternately as '00' or '11'. This code gives good timing information for use at the receiving terminal of the system regardless of the data actually being signalled. Negative transitions of the transmitted waveform (i.e. from '1' to '0') occur only at the ends of data bits periods and such transitions are utilised at the receiving terminal to synchronise a clock pulse generator which controls the operation of decoding apparatus at that terminal.

14 Claims, 2 Drawing Figures

DIGITAL DATA SIGNALLING SYSTEMS AND APPARATUS THEREFOR

This invention relates to digital data signalling systems and apparatus therefor.

A conventional binary signal carrying data (for example a PCM signal) is not d.c. balanced, that is to say the two binary values (corresponding to '0' and '1' respectively) do not necessarily occur an equal number of times. Such a signal thus may have a direct current component or at least a component having a relatively low frequency compared with the digit rate and this places some restriction on the type of communication path over which it can be transmitted without undue distortion.

Apparatus responsive to a binary signal carrying data usually has a clock pulse generator operating at the digit rate, clock pulses supplied by this generator being utilised for timing purposes. It is, of course, essential for this generator to operate in step with the incoming binary signal and, to this end, it is desirable for the generator to be synchronised at fairly regular intervals by the incoming signal. However with a conventional binary signal such synchronisation is not possible since, in certain cases, there is no suitable timing information in the signal that can be used for synchronising the clock pulse generator. Examples of such cases are long series of '0's if the binary waveform is return-to-zero and long series of either '0's or '1's if the binary waveform is non-return-to-zero.

One object of the present invention is to provide a digital data signalling system in which the difficulties referred to above are avoided.

In a digital data signalling system according to the present invention, the transmitted signal is of binary form and carries the data of an input binary signal at twice the digit rate of the input signal, each digit of the input signal having one particular binary value being represented in the transmitted signal by a pair of digits having the value '01' (or '10') and digits of the input signal having the other binary value being represented by pairs of digits having the values '00' and '11' alternately.

It will be appreciated that the code set out in the last paragraph ensures that the digit values '0' and '1' occur the same number of times in the transmitted signal so that the signal is d.c. balanced. Furthermore the code provides for frequent transitions between the two digit values which can be utilised for synchronising a clock pulse generator of decoding apparatus to which the transmitted signal is supplied. Preferably synchronisation of the clock pulse generator is effected in response to transitions between the two signal levels in the direction that occurs only at the end of said pairs of digits.

A data signalling system in accordance with the present invention is particularly suited for use over a relatively short transmission path, say of the order of several tens of metres, within a repeater or other station of a public telephone network. The system may be provided between the line terminal equipment of multi-level digital data transmission system (for example a system utilising the so-called alternate mark inversion code in which binary '0' is represented by ternary '0' and binary 1' is represented by ternary values +1 and −1 alternately) and digital multiplexing equipment for combining the data in question with data from other sources.

According to a feature of the present invention, in coding apparatus for deriving from an input signal carrying data in binary form an output signal carrying the same data in binary form but with twice the digit rate, the conversion code is such that each digit of the input signal having one particular binary value is represented by '01' (or '10') in the output signal and digits of the input signal having the other binary value are represented by '00' and '11' alternately.

According to another feature of the present invention, decoding apparatus which is for use with an input signal as supplied by coding apparatus as defined in the least paragraph comprises means for delaying the input signal for approximately one bit period at the digit rate of that signal, and means to combine the delayed and undelayed input signal so as to derive a binary signal in which every alternate bit period carries the original data in decoded form. The means to combine the delayed and undelayed input signal may be an exclusive NOR gate.

Figure 2:
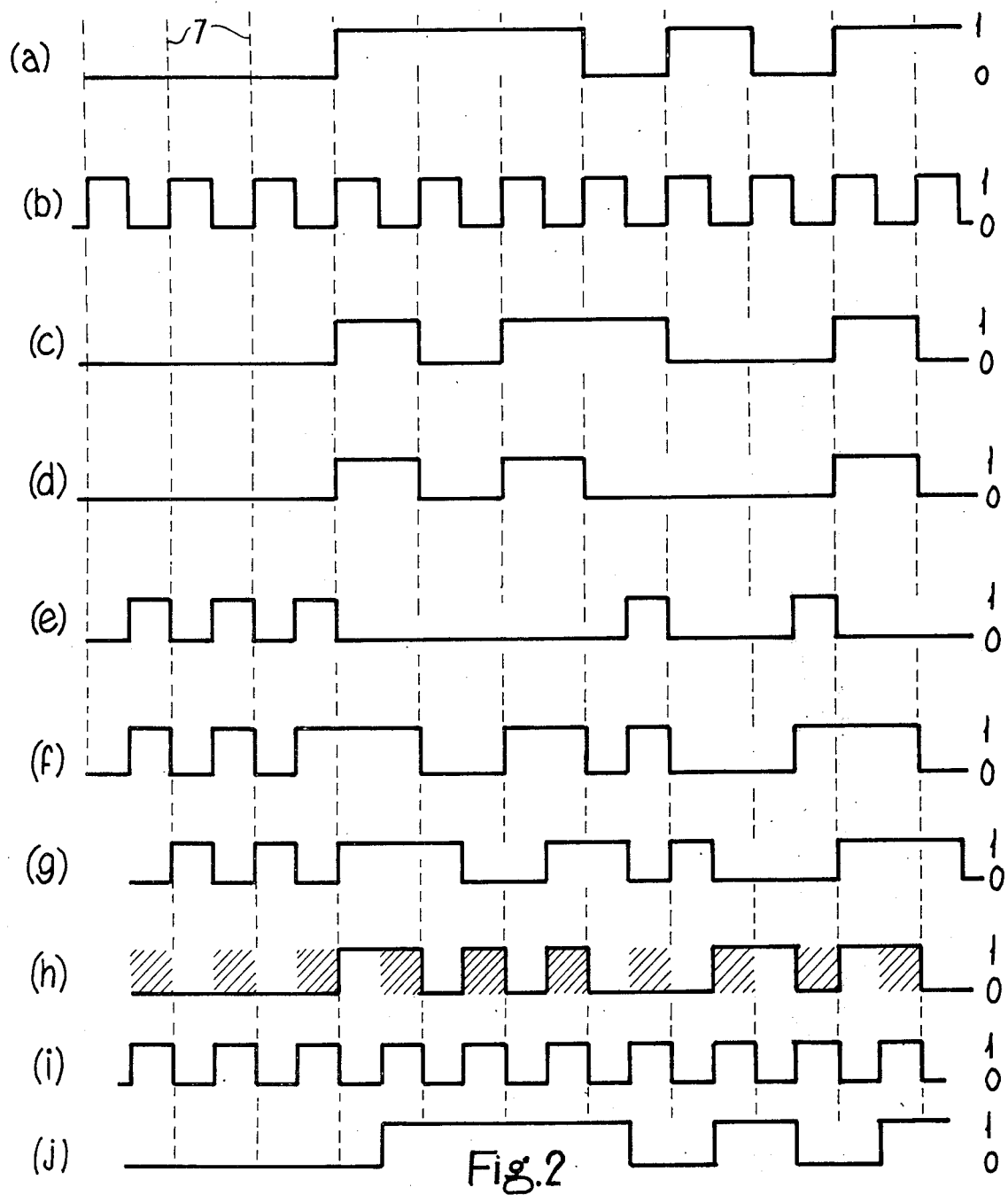

A digital data signalling system in accordance with the present invention will now be described by way of example with reference to the two figures of the accompanying drawings in which FIG. 1 shows the complete system diagrammatically and, FIG. 2 shows typical waveform of signals occurring within the system, the waveforms (a), (b), (c) etc. being developed at the points marked, A, B, C, etc. respectively in FIG. 1.

The system now to be considered is installed at a repeater or other station of a public telephone network and, referring to FIG. 1 of the accompanying drawings, provides an interface between two units 1 and 2 that are physically separated by a distance of the order of 120 metres. As shown, the unit 1 may be line terminal equipment which responds to a multi-level digital data signal received over a path 3 and which supplies a binary signal (subsequently referred to as the "input binary signal") having a non-return-to-zero waveform over a lead 4. The digit rate of the input binary signal may be in the region of 120 megabits per second. The unit 2 may be digital multiplexing equipment which is arranged to combine the binary signal supplied by the unit 1 with similar binary signals supplied by other sources, the unit 2 supplying the resulting multiplexed signal to a path 5.

The coding and decoding terminals of the system under consideration are located adjacent to the units 1 and 2 respectively and are connected by a transmission path 6, for example a co-axial line preferably via a transformer at one end of the path 6 to ensure d.c. isolation. In FIG. 1, the apparatus of the coding and decoding terminals are shown respectively in the upper and lower parts of the drawing.

The signal transmitted over the transmission path 6 is a binary signal which carries the data of the input binary signal supplied over the lead 4 according to the following code:

| Signal on Lead 4 | Signal on Transmission Path 6 |
| --- | --- |
| 0 | 01 |
| 1 | 00 or 11 alternately |

It will be appreciated that the binary signal supplied over the path 6 has twice the digit rate of the input binary signal and is therefore subsequently referred to as the 'double-rate' binary signal. FIG. 2(a) shows the waveform of a typical input binary signal, the individual bit periods being separated by broken lines 7. The corresponding waveform of the resulting double-rate binary signal is shown in FIG. 2(f).

Referring again to FIG. 1 of the drawings, the coding apparatus includes a clock pulse generator 9 which supplies a train of clock pulses (FIG. 2(b)) at the digit rate of the input binary signal. A coincidence (AND) gate 10 is responsive to the clock pulses and to the signal on the lead 4 so as to supply a signal which consists of clock pulses whenever the input signal has the binary value '1' and which is utilised to which a bistable circuit 11. The waveform of the signal supplied by the circuit 11 over a lead 12 is shown in FIG. 2(c).

The signals on leads 4 and 12 are combined by a coincidence (AND) gate 13 to derive a signal having the waveform of FIG. 2(d). Similarly a NOR gate 14 responds to the train of clock pulses supplied by the generator 9 and the input binary signal to supply a signal having the waveform of FIG. 2(e). The signals supplied by the gates 13 and 14 are combined by the OR gate 15 to provide the double-rate binary signal for feeding to the transmission path 6.

At the decoding terminal, the double-rate binary signal supplied over the path 6 may be subjected in known manner to equalisation and waveform shaping (not shown but which may result in an overall rising transmission gain with frequency without detriment to the ability of the decoding apparatus correctly to recognise the double-rate signal without recourse to automatic gain control). The double-rate binary signal is passed through a delay element 16 which introduces a delay of one bit period of the double-rate signal. The undelayed double-rate binary signal and the delayed signal supplied by the element 16 (having the waveforms of FIGS. 2(f) and 2(g) respectively) are passed to an exclusive NOR gate 17 which supplies a signal having the waveform of FIG. 2(h). It will be noted that the signal supplied by the gate 17 during the second half of each bit period identified by adjacent pairs of lines 7 carries the data of the input binary signal in decoded form, the relevant half bit periods being cross-hatched in FIG. 2(h) for ease of identification.

The decoding apparatus also includes a clock pulse generator 18 which operates at the same frequency as the generator 9 and which is arranged to supply a train of clock pulses having the waveform of FIG. 2(i). The generator 18 is arranged, in known manner, to be synchronised by negative-going transitions in the received double-rate binary signal so as to lock the generator 18 in frequency and phase to the received signal. In this connection it will be appreciated that such negative-going transitions occur only at the end of bit periods defined by the lines 7 (whereas positive-going transitions can only occur mid-way through those bit periods) so that unambiguous phase lock of the generator 18 is achieved.

The signal supplied by the gate 17 and the inverse of that signal as supplied by an inverter 19 are utilised to control the state of a bistable circuit 20 upon the occurrence of each clock pulse supplied by the generator 18. In this way the bistable circuit 20 supplies over a lead 21 a bistable signal having the waveform of FIG. 2(j) which is identical to that of the input binary signal (FIG. 2(a)) but slightly delayed.

I claim

1. A digital data signaling system comprising:
   A. transmitting terminal apparatus,
   B. receiving terminal apparatus, and
   C. a transmission path connected between the transmitting and receiving terminal apparatuses for transmission of an interterminal signal of binary digit form,
   D. said transmitting terminal apparatus comprising
      I. an input path to carry input signals of binary digit form constituting signals of a first predetermined value and signals of a second predetermined value, and
      II. coding means connected between the input path and the transmission path to provide from each input signal binary digit a pair of coded signal binary digits which are fed to the transmission path,
         a. each pair of coded dual signal binary digits
            i. for the input signal binary digit of said first predetermined value being a pair of binary digits of different predetermined binary values, and
            ii. for the input signal binary digit of said second predetermined value being alternately a first pair of binary digits comprising two digits of the same predetermined binary value and a second pair of binary digits comprising two digits of the other predetermined binary value.

2. A digital data signalling system according to claim 1 wherein said receiving terminal apparatus comprises an output path and decoding means connected between the transmission path and the output path to derive from the inter-terminal signal a reproduction of the input signal which is supplied to the output path.

3. A digital data signaling system according to claim 2 wherein said receiving terminal apparatus includes a clock pulse generator which supplies a train of clock pulses to control operation of the decoding means and synchronizing means responsive to the pairs of coded signal binary digits supplied over said transmission path to synchronize said clock pulse generator upon each transition between the two levels of the pairs of coded signal binary digits supplied over the transmission path in the direction that occurs only at the end of said pairs of digits.

4. Decoding apparatus comprising:
   A. an input path to carry an input signal which is in the form of a succession of pairs of digits,
      I. some of said binary digits pairs constituting signal digits of different predetermined binary values and
      II. Others of said binary digits pairs alternately constituting, firstly, signals digits of a like first predetermined binary value and, secondly, signal digits of a like second predetermined binary value,
   B. an output path, and
   c. decoding means connected between the input and output paths to derive from the input signal an output signal of binary form in which
      I. each binary digit corresponds to a pair of signal digits in the input signal according to a decoding arrangement in which
         i. each pair of input signal digits having different predetermined values results in the associated binary digit of the output signal having one binary value and ii. each pair of input signal digits having the same predetermined value results in the associated binary digit of the output signal having the other binary value.

5. Decoding apparatus according to claim 4 wherein said decoding apparatus includes a clock pulse generator which supplies a train of clock pulses to control operation of the decoding means and synchronizing means responsive to said input binary digit signals supplied on said input path to synchronize said clock pulse generator upon each transition between the two levels of the pairs of binary digit on said input path in the direction that occurs only at the end of said pairs of digits.

6. Decoding apparatus according to claim 4 wherein said decoding means comprises means to delay the input signal for approximately one digit period at the digit rate of the input signal and combining means responsive to the delayed and undelayed input signal to supply said output signal of binary form.

7. Decoding apparatus according to claim 6 wherein said combining means comprises an exclusive NOR gate which supplies a binary signal which has the same digit rate as the input signal and which carries binary data in alternate digit periods.

8. Decoding apparatus according to claim 7 wherein a bistable circuit is connected between said exclusive NOR gate and said output path, said bistable circuit being operative to cause the binary output signal supplied to the output path to have a digit rate that is one half that of the input signal.

9. Coding apparatus comprising:
   A. an input path to carry an input signal of binary form constituting signals of a first predetermined value and signals of a second predetermined value,
   B. an output path to carry an output signal of binary form, and
   C. coding means connected between the input path and the output path to derive from each input signal binary digit a pair of coded signal binary digits which are fed to the output path,
      I. each pair of coded signal binary digits
         i. for the first input signal binary digit of said first predetermined value being two coded signals digits of different predetermined binary values, and
         ii. for the input signal binary digit of said second predetermined value being alternately two pairs of coded signal digits of which the first pair of coded signal digits constitutes two digits of the same predetermined binary value and the second pair of coded signal digits constitutes two digits of the other predetermined binary value.

10. Coding apparatus comprising:
    A. an input path to carry an input signal in binary form,
    B. first coding means responsive to input signal digits having one binary value to supply during the period of each such digit a first code signal having successively two different values,
    C. second coding means responsive to input signal digits having the other binary value to supply during the period of each such digit a second code signal having alternately two different values for successive such input signal digits,
    D. an output path, and
    E. combining means responsive to the first and second code signals to supply to the output path an output binary signal in which each digit of the input signal is represented by a pair of coded binary digits,
       I. each input signal digit having said one binary value being represented in the output signal by a pair of digits of which the first digit has one predetermined coded binary value and the second digit has another predetermined coded binary value and
       II. input signal digits of the other value being represented in the output signal by alternately appearing by pairs of binary digits of which the two digits of one pair each have one binary value and
       III. the two digits of the other pair have the other binary value.

11. In combination, in a digital data signaling system which comprises an input path to carry an input signal of binary form, a transmission path and coding means connected between the input path and one end of the transmission path to supply to the transmission path a coded binary signal in which each digit of the input signal is represented by a pair of binary digits, each input signal digit having a particular binary value being represented in the coded signal by a pair of digits of which the first digit is a predetermined binary value and the second digit has the other binary value and input signal digits of the other value are represented in the coded signal by pairs of binary digits of which the two digits of each pair have the same binary value and the binary values of successive digital pairs alternate, decoding apparatus including decoding means connected to the other end of said transmission path, said decoding means comprising
   I. delay means to delay the binary signal supplied over said transmission path by approximately one digit period at the digit rate of said binary signal and
   II. combining means responsive to the delayed signal supplied by said delay means and the undelayed signal supplied over said transmission path to supply a signal of binary form carrying the information of the said input signal.

12. Decoding means according to claim 11 in combination with a clock pulse generator which supplies a train of clock pulses to control operation of the decoding means and synchronizing means responsive to the binary signal supplied over said transmission path to synchronize said clock pulse generator upon each transition between the two levels of the binary signal supplied over the transmission path in the direction that occurs only at the end of said pairs of digits of said coded binary signal.

13. Decoding means according to claim 11 wherein said combining means comprises an exclusive NOR gate.

14. Decoding means according to claim 13 wherein a bistable circuit is connected between said exclusive NOR gate and an output path, said bistable circuit being operative to cause the binary signal supplied to the output path to have a digit rate that is the same as that of said input signal.

* * * * *

Disclaimer 3,953,673.—*Richard M. Dorward,* Coventry, England, DIGITAL DATA SIG-
NALLING SYSTEMS AND APPARATUS THEREFOR. Patent
dated Apr. 27, 1976. Disclaimer filed Sept. 19, 1983, by the assignee,
*The General Electric Co., p. l. c.*

Hereby enters this disclaimer to claims 1, 2, 4, 9 and 10 of said patent.
*[Official Gazette July 31, 1984.]*